US008687386B2

(12) United States Patent
Martinelli

(10) Patent No.: US 8,687,386 B2
(45) Date of Patent: Apr. 1, 2014

(54) SYNCHRONOUS RECTIFIER BI-DIRECTIONAL CURRENT SENSOR

(75) Inventor: Robert Matthew Martinelli, Murrieta, CA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 12/961,452

(22) Filed: Dec. 6, 2010

(65) Prior Publication Data

US 2012/0140538 A1    Jun. 7, 2012

(51) Int. Cl.
   *H02M 3/335*    (2006.01)
(52) U.S. Cl.
   USPC ............. 363/21.06; 363/21.14; 363/127
(58) Field of Classification Search
   USPC ........... 323/239, 324; 363/21.06, 21.14, 125
   See application file for complete search history.

(56) References Cited

U.S. PATENT DOCUMENTS

| 3,816,804 | A  | * | 6/1974  | Cardwell, Jr. ............ 320/102 |
| 6,462,965 | B1 | * | 10/2002 | Uesono .................. 363/21.14 |
| 6,529,390 | B2 | * | 3/2003  | Takahashi ............... 363/21.14 |
| 6,961,253 | B1 | * | 11/2005 | Cohen ....................... 363/89 |
| 7,609,037 | B1 | * | 10/2009 | Herbert ................... 323/266 |
| 2002/0101741 | A1 | * | 8/2002  | Brkovic ..................... 363/16 |
| 2003/0128556 | A1 | * | 7/2003  | Zhang .................... 363/21.06 |
| 2009/0213628 | A1 | * | 8/2009  | Yang et al. ................. 363/89 |
| 2009/0251925 | A1 | * | 10/2009 | Usui et al. .................. 363/16 |
| 2010/0027298 | A1 | * | 2/2010  | Cohen .................... 363/21.14 |
| 2010/0320949 | A1 | * | 12/2010 | Fotherby ................ 318/400.26 |

* cited by examiner

*Primary Examiner* — Adolf Berhane
*Assistant Examiner* — Gustavo Rosario Benitez
(74) *Attorney, Agent, or Firm* — Ameh IP; Lowell Campbell; Elahe Toosi

(57) ABSTRACT

A method and apparatus for bi-directional current sensing for a synchronous rectifier bi-directional converter system is disclosed. A first current is measured through a first synchronous rectifier via a first transformer to provide a first signal. A second current is measured through a second force synchronous rectifier via a second transformer to provide a second signal. The first signal and the second signal are DC restored to provide a first DC restored signal and a second DC restored signal respectively. A first correction current is added to the first DC restored signal to produce a first corrected signal, and a second correction current is added to the second DC restored signal to produce a second corrected signal. The first corrected signal and the second corrected signal are added to produce a combined signal.

20 Claims, 9 Drawing Sheets

SYNCHRONOUS RECTIFIER BI-DIRECTIONAL CURRENT SENSOR

FIELD

Embodiments of the present disclosure relate generally to voltage and current sensors. More particularly, embodiments of the present disclosure relate to voltage and current sensors for bi-directional voltage converters.

BACKGROUND

In a bi-directional voltage converter separate voltage regulators generally are employed for each direction of current flow. Generally, two different current sense amplifiers measure a voltage across a shunt. There are at least three significant problems associated with this approach. First, a shunt in series with the input path introduces a significantly large power loss. For example, for a voltage across the shunt of 50 mV in a 100 A system, a power dissipation may be on an order of 5 W. Second, when charging a battery, a current through the shunt may be approximately ⅕ of a discharge current, and a voltage across the shunt would be only 10 mV. With such a small signal in a switching regulator where high frequency noise is radiated by a power stage, it may be very difficult to make a current sensor that accurately measures a current. Thirdly, a wide bandwidth amplifier that has very high gain and extreme accuracy may be subject to high frequency radiated and conducted emissions.

SUMMARY

A method for bi-directional current sensing for a synchronous rectifier bi-directional converter system is disclosed. A first current is measured through a first force commutated synchronous rectifier via a first transformer to provide a first signal. A second current is measured through a second force commutated synchronous rectifier via a second transformer to provide a second signal. The first signal and the second signal are DC restored to provide a first DC restored signal and a second DC restored signal. A first correction current is added to the first DC restored signal to provide a first corrected signal, and a second correction current is added to the second DC restored signal to provide a second corrected signal. The first corrected signal and the second corrected signal are added to provide a combined signal.

In this manner, a bi-directional current sense circuit is provided that is a signal processor that does not sacrifice bandwidth or accuracy to create a replica of an inductor current for use as a feedback signal or telemetry signal. Signals in the circuit are relatively large (on the order of 1V) and therefore an amplifier gain of the circuit can be low. Therefore, a reasonably accurate reproduction of the inductor current can be achieved with a standard op amp with a bandwidth of approximately 1 mega-Hz and input offset voltage drift of a few millivolts. The power dissipation associated with the circuit described herein is reasonably low and no special bias voltages are required that wouldn't normally be available In an embodiment, a method for bi-directional current sensing for a synchronous rectifier bi-directional converter system comprises a first current measured/sensed through a first force commutated synchronous rectifier via a first transformer to provide a first signal. A second current is measured/sensed through a second force commutated synchronous rectifier via a second transformer to provide a second signal. The first signal and the second signal are then DC restored to provide a first DC restored signal and a second DC restored signal respectively. A first correction current is added to the first DC restored signal to produce a first corrected signal, and a second correction current is added to the second DC restored signal to produce a second corrected signal. The first corrected signal and the second corrected signal are added to produce a combined signal.

In another embodiment, a synchronous rectifier bi-directional current sensor system comprises a first transformer operable to sense a first current from a first synchronous rectifier to provide a first signal. The system further comprises a second transformer operable to sense a second current from a second synchronous rectifier to provide a second signal, and a DC restoration and summing amplifier circuit. The DC restoration and summing amplifier circuit comprises a DC restoration circuit operable to DC restore the first signal and the second signal to provide a first DC restored signal and a second DC restored signal, and a DC summing amplifier.

The DC summing amplifier comprises a first adding circuit operable to produce a first corrected signal by adding a first correction current to the first DC restored signal, and a second adding circuit operable to produce a second corrected signal by adding a second correction current to the second DC restored signal respectively. The DC summing amplifier further comprises a summing inverting amplifier operable to produce a combined signal by adding and amplifying the first corrected signal and the second corrected signal, and an inverting amplifier operable to produce the first correction current and the second correction current by inverting the combined signal.

In yet another embodiment, a method for operating a bi-directional current sensor system senses a first signal of a first force commutated synchronous rectifier of a bi-directional converter with a first transformer. The method further senses a second signal of a second force commutated synchronous rectifier of a bi-directional converter with a second transformer, and DC restores the first signal and the second signal to provide a first DC restored signal and a second DC restored signal respectively. The method also feedback corrects the first signal and the second signal to provide a bi-directional signal that is proportional to a bi-directional current through the bi-directional converter, and controls a bi-directional converter based on the bi-directional signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
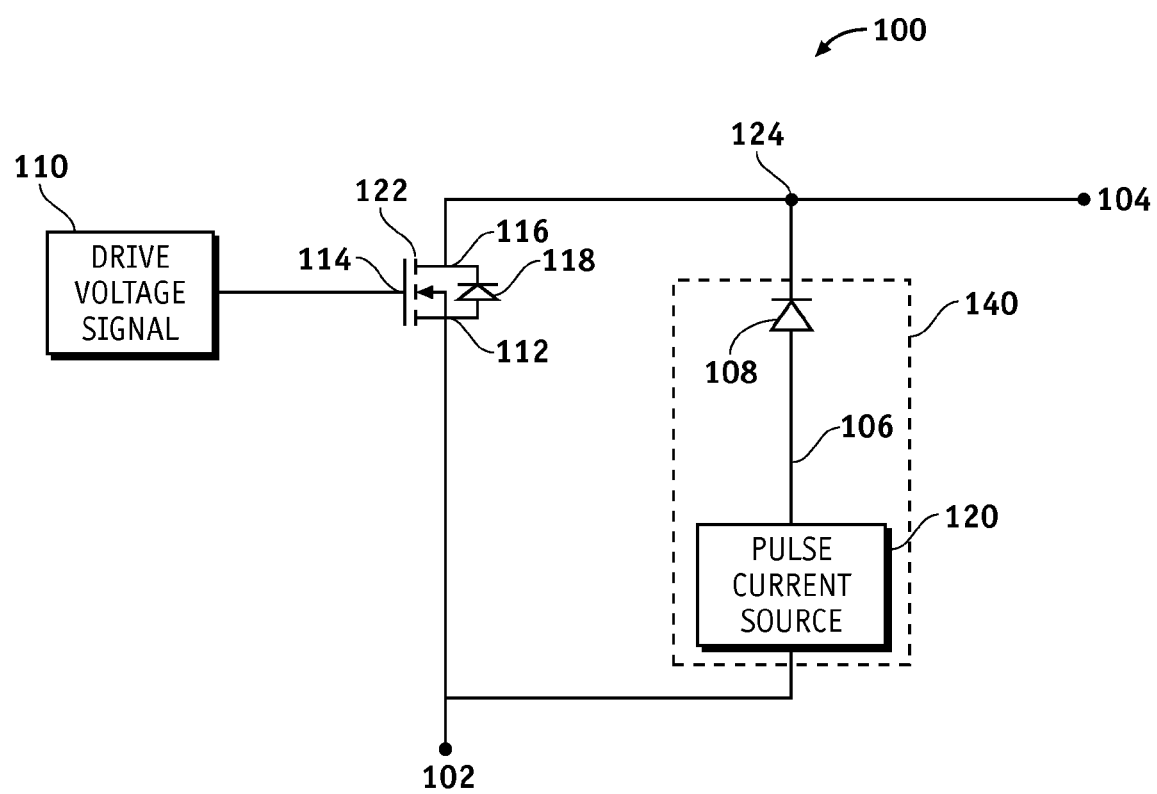
FIG. 1 is an illustration of an exemplary force commutated synchronous rectifier according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to circuit design, and other functional aspects of the systems (and the individual operating components of the systems) may not be described in detail herein. In addition, those skilled in the art will appreciate that embodiments of the present disclosure may be practiced in conjunction with a variety of computational hardware and software, and that the embodiments described herein are merely example embodiments of the disclosure.

Embodiments of the disclosure are described herein in the context of a practical non-limiting application, namely, voltage conversion on a spacecraft. Embodiments of the disclosure, however, are not limited to such spacecraft applications, and the techniques described herein may also be utilized in other applications. For example but without limitation, embodiments may be applicable to various voltage conversion applications and circuits, vehicles, automobiles, aircraft, ships, boats, buildings, electrical equipment, electric motors, battery operated and augmented vehicles and vehicle systems, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide two forced commutation synchronous rectifiers that can be used in such a way that a converter can efficiently process power in two directions. For example, a bi-directional converter can be used as both the discharge regulator to maintain constant bus voltage during eclipse and then the same converter can be used to regulate charge current to the battery when a solar array is in sunlight.

The technique described in herein makes possible extremely efficient bi-directional converters that can, for example but without limitation, regulate a charge current of a battery in sunlight mode of a space station and regulate a bus from the battery in eclipse mode of a space station with a single converter. Such a single converter may be used rather than separate hardware for regulating the charge current and the bus in existing systems. By employing synchronous rectification, embodiments of the disclosure can be more efficient than previous generations of spacecraft bus regulation hardware.

Embodiments of the disclosure comprise a synchronous rectifier bi-directional current sensor comprising a current sensor for a voltage step-down/step-up (e.g., buck/boost) regulator/converter where two power switches are each synchronously rectified. For example, a force commutated synchronous rectifier may allow current to flow in either direction without causing high switching losses associated with a recovery time of a body diode of a FET used for the force commutated synchronous rectifier that operates as a rectifier. When the bi-directional synchronous converter is processing power from a bus to charge a battery, the bi-directional synchronous converter operates as a step-down (e.g., buck) voltage regulator/converter and a low side switch operates as a rectifier while the high side switch operates as a voltage step-down (e.g., buck) converter power switch. Similarly, when the battery is supplying power to the bus, the bi-directional synchronous converter operates as a step-up (e.g., boost) voltage regulator/converter where the high side switch operates as a rectifier while the high side switch operates as a power switch. In this manner, embodiments of the synchronous rectifier bi-directional current sensor disclosed herein sense current for a voltage step-down mode (e.g., buck mode) and for a voltage step-up mode (e.g., boost mode) of a regulator/converter.

FIG. 1 is an illustration of an exemplary force commutated synchronous rectifier 100 according to an embodiment of the disclosure. FIG. 1 shows a bi-directional converter where current can flow from a first bus 102 (e.g., from a battery) to a second bus 104/output terminal 104 (e.g., to a spacecraft 100V bus) or from the second bus 104 to the first bus 102 (input terminal 102) depending on a duty cycle of power switches (not shown). Since very small duty cycle changes can change a direction of a current from discharging the first bus 102 to charging the first bus 102, it is desirable to measure/sense an inductor current of an inductor coupled to the force commutated synchronous rectifier 100, so that feedback loops can be added to allow fine control of both a magnitude and a direction of current flow.

The force commutated synchronous rectifier 100 comprises a switching component, such as a field effect transistor (FET) 122 electrically coupled to a forced commutation circuit 140. The FET 122 comprises a source terminal 112, a gate terminal 114, a drain terminal 116, and an intrinsic body diode 118. For example but without limitation, the FET 122 shown in FIG. 1 comprises an n-type FET, where, an anode of the intrinsic body diode 118 is connected to the source terminal 112, and a cathode of the intrinsic body diode 118 is connected to the drain terminal 116.

While the embodiment shown in FIG. 1 utilizes an n-type FET as an example, the FET 122 may comprise any switching component, such as but without limitation, the n-type FET, a p-type FET, a switch, or the like, which comprises an intrinsic body diode that may have an associated reverse recovery time. In an embodiment where the FET 122 is a p-type FET, a direction of the intrinsic body diode 118 may be reversed. In this arrangement, a cathode of the intrinsic body diode 118 is connected to a source terminal of the p-type FET and an anode of the intrinsic body diode 118 is connected to a drain terminal of the p-type FET. In another embodiment, the switching component may be a rectifier switch used in power supply topologies.

Typically, n-type FETs allow a current to flow between the source terminal and the drain terminal when the gate terminal is supplied with a voltage greater than a threshold voltage associated with switching on the FET. When the voltage supplied to the gate terminal is reduced to below the threshold voltage or is removed completely, the FET is switched off and the current flowing between the source terminal and the drain terminal stops flowing. If the current is flowing from the source terminal to the drain terminal when the FET is switched off, the intrinsic body diode 118 of the FET requires a period of time to recover since the current was flowing in the forward-bias direction of the intrinsic body diode 118. This is called the reverse recovery time.

However, if the current is flowing from the drain terminal to the source terminal when the FET is switched off, there is no reverse recovery time needed since the current was already flowing in the reverse-bias direction of the body diode. Using the concepts described above, the reverse recovery time of a diode can be eliminated by forced commutating a current from a cathode terminal of a diode to an anode terminal of the diode during the switch-off event associated with the FET.

The gate terminal 114 of the FET 122 is electrically coupled to a drive voltage source 110, which controls the switching of the FET 122. When the drive voltage source 110 provides a threshold voltage to the gate terminal 114, the FET 122 is switched on. When the gate terminal 114 of the FET 122 does not have a voltage, the FET 122 is switched off. A current is configured to flow into the source terminal 112 of the FET 122 through an input terminal 102, while the current flowing out of the FET 122 flows towards an output terminal 104.

As described above, the FET 122 is electrically coupled to the forced commutation circuit 140. The forced commutation circuit 140 comprises a pulse current source 120 (selectively controlled forced commutation current source) and a commutation diode 108. The pulse current source 120 may be configured to generate a commutation current that is configured to be greater than a current entering through the input terminal 102. In one embodiment, the commutation current is a pulse current that is supplied from the force commutated synchronous rectifier 100 for a very brief period of time. The pulse current source 120 is electrically coupled to an anode terminal of the commutation diode 108 at terminal 106.

The commutation diode 108 comprises an anode terminal (not shown), which is electrically coupled to the pulse current source 120 at the terminal 106. The commutation diode 108 also comprises a cathode terminal (not shown), which is electrically coupled to the drain terminal 116 of the FET 122 and the output terminal 104 at a node 124. In this way, the commutation diode 108 is in parallel with the FET 122. The commutation diode 108 should be arranged in such a manner that the cathode terminal of the commutation diode 108 is connected to the cathode terminal of the intrinsic body diode 118.

The force commutated synchronous rectifier 100 may operate in four phases. In a first phase, both the FET 122 and the pulse current source 120 are switched off, whereby the pulse current source 120 is not supplying a commutation current. In this phase, an input current enters the force commutated synchronous rectifier 100 at the input terminal 102, flows through the commutation diode 108, and outputs the force commutated synchronous rectifier 100 at the output terminal 104.

In a second phase, the FET 122 is switched on and the pulse current source 120 remains switched off. In this phase, the input current enters at the input terminal 102 and flows through the FET 122 from the source terminal 112 to the drain terminal 116, and exits through the output terminal 104. The current no longer flows through the commutation diode 108 since the voltage drop across the FET 122 is smaller than the forward voltage of the commutation diode 108.

In a third phase, while the FET 122 is switched on, the pulse current source 120 is also switched on. In this phase, the input current enters the force commutated synchronous rectifier 100 at the input terminal 102, and flows through the pulsed current source 120 and the commutation diode 108. In addition, the pulse current source 120 supplies a commutation current that flows through the commutation diode 108 and the FET 122. At the node 124, the input current flows to the output terminal 104, while the commutation current passes through the FET 122 from the drain terminal 116 to the source terminal 112.

In a fourth phase, the FET 122 is switched off while the commutation current is flowing through the FET 122 from the drain terminal 116 to the source terminal 112. In this phase, the commutation current stops flowing and the input current flows through the commutation diode 108 and outputs at the output terminal 104. To eliminate the reverse recovery time associated with the intrinsic body diode 118 of the FET 122, the FET 122 should be switched off while a current is flowing through the FET 122 from the drain terminal 116 to the source terminal 112 (opposite the direction of the intrinsic body diode 118). By following the sequence of events delineated by the four phases, the FET 122 is switched off while the commutation current is flowing through the FET 122 from the drain terminal 116 to the source terminal 112. Accordingly, the reverse recovery time associated with the FET 122 is eliminated.

The force commutated synchronous rectifier 100 described above may be utilized as a building block for a variety of applications. In particular, switching applications that utilize a switching component that comprises a body diode may perform more efficiently through the utilization of the force commutated synchronous rectifier 100 described above. In addition, switching regulators, such as buck converters, boost converters, and buck-boost converters, may also utilize the force commutated synchronous rectifier 100 described above.

Conventional switching regulators may use a rectifier to provide a current path for the inductor current during an off time of a main FET. With modern improvements, it has become practical to replace a rectifier with a FET as a reverse recovery time of FETs has become quite small with very little energy dissipated as a result. However, in high voltage applications, reverse recovery times are relatively substantial, causing significant power dissipation as well as limits on the switching frequency of a FET.

To eliminate the reverse recovery time of an intrinsic body diode of a FET being utilized as a rectifier in high voltage switching regulator applications, such as a boost converter, a conventional rectifier or synchronous switched FET may be replaced with the force commutated synchronous rectifier 100 described in FIG. 1. In rectification applications involving a switch, the rectification cycles through the four phases described above. These cycles may be referred to as a rectifier switch cycle. The fourth phase occurs at the switch-off edge of the rectifier switch cycle. In high voltage rectifier applications, the voltage applied to the switch, such as the FET, may be greater than 60 V.

Figure 2:
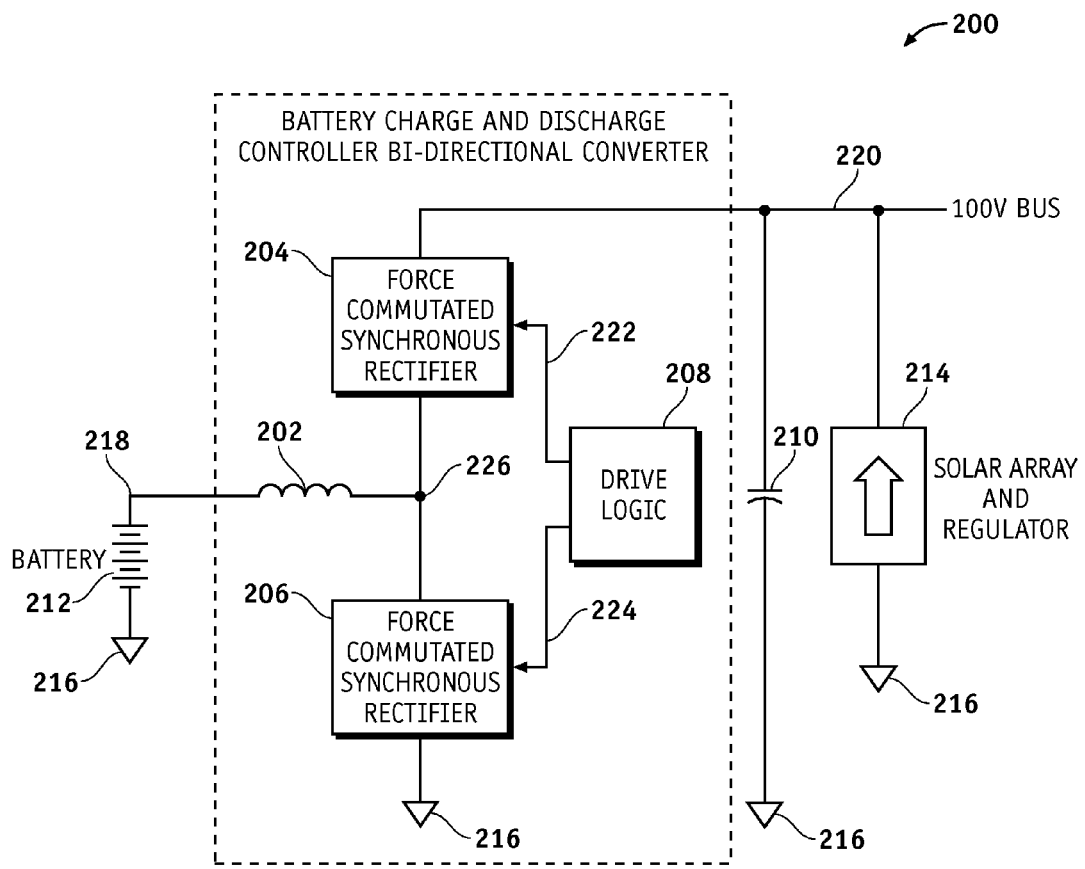
FIG. 2 is an illustration of an exemplary synchronous rectifier bi-directional converter system according to an embodiment of the disclosure.

FIG. 2 is an illustration of an exemplary synchronous rectifier bi-directional converter system 200 according to an embodiment of the disclosure. The synchronous rectifier bi-directional converter system 200 comprises an inductor 202, a first force commutated synchronous rectifier 204, a second force commutated synchronous rectifier 206, drive logic 208, a boost side capacitor 210, a battery 212, a solar array 214, and common ground 216. FIG. 2 shows a partial schematic of a partial schematic of a power stage for the synchronous rectifier bi-directional converter system 200 operating as a battery charge/discharge regulator.

The inductor 202 is coupled to the first force commutated synchronous rectifier 204 and the second force commutated synchronous rectifier 206 via a bus 226, and is coupled to the battery 212 via a link 218. The first force commutated synchronous rectifier 204 is coupled to the drive logic 208 via a link 222, and the second force commutated synchronous rectifier 206 is coupled to the drive logic 208 via a link 224. The boost side capacitor 210 is coupled to the solar array 214 and the first force commutated synchronous rectifier 204 via a bus 220. The battery 212, the second force commutated synchronous rectifier 206, the boost side capacitor 210, and the solar array 214 are each connected to the common ground 216 respectively.

In a spacecraft application, a voltage of a bus 220 is higher than a voltage of the battery 212. Therefore, when the solar array 214 is producing insufficient power to meet the spacecraft needs, the synchronous rectifier bi-directional converter system 200 draws power from the battery 212 to provide a necessary current for the bus 220. When the solar array 214 has excess power available, the synchronous rectifier bi-directional converter system 200 becomes a voltage step-down regulator to charge the battery 212. Therefore, since current must flow out of the battery 212 to power the bus 220 and into the battery 212 to charge the battery 212, the synchronous rectifier bi-directional converter system 200 is a bi-directional power processor. Furthermore, since the switching rectifiers are FETs that are turned on at the appropriate times, the synchronous rectifier bi-directional converter system 200 is synchronous rectified.

Since the voltage drop of a FET is generally much lower than the voltage drop of a rectifier, the synchronous rectifier bi-directional converter system 200 can achieve much higher efficiency than a conventional buck or boost regulator. That is, when boosting from an 80V battery to a 100V bus, an existing boost regulator may have an efficiency of approximately 96.5%. The synchronous rectifier bi-directional converter system 200 may have an efficiency of approximately 98%. This efficiency improvement is a result of reduced rectifier losses and reduced switching losses associated with the synchronous rectifier bi-directional converter system 200.

Figure 3:
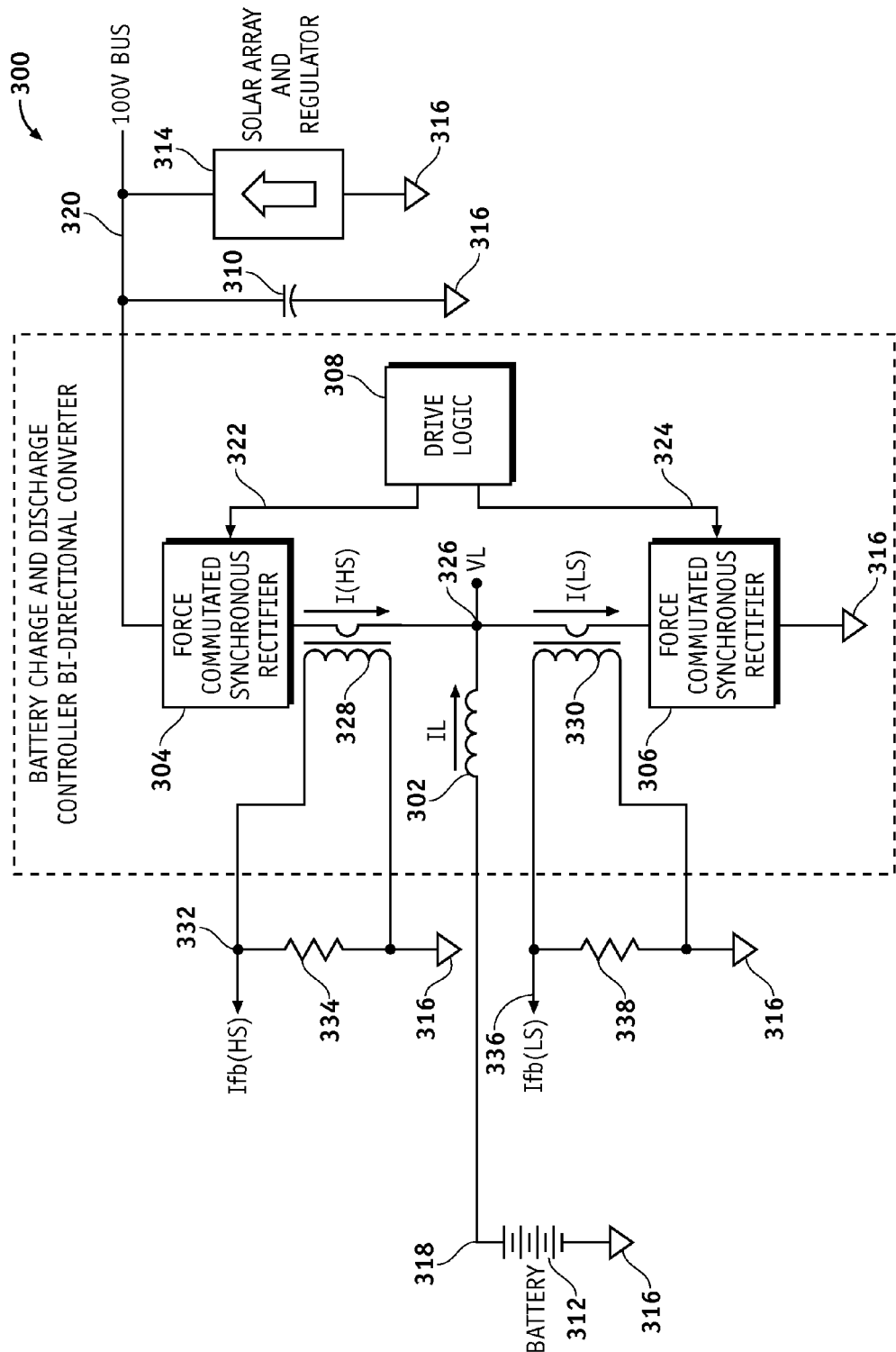
FIG. 3 is an illustration of an exemplary synchronous rectifier bi-directional converter system coupled to a current sensor according to an embodiment of the disclosure.

FIG. 3 is an illustration of an exemplary synchronous rectifier bi-directional converter system 300 coupled to a current sensor according to an embodiment of the disclosure. The synchronous rectifier bi-directional converter system 300 (system 300) comprises an inductor 302 (202 in FIG. 2), a first force commutated synchronous rectifier 304 (high side switch 304, 204 in FIG. 2), a second force commutated synchronous rectifier 306 (low side switch 306) (206 in FIG. 2), drive logic 308 (208 in FIG. 2), a boost side capacitor 310 (210 in FIG. 2), a battery 312 (212 in FIG. 2), a solar array 314 (214 in FIG. 2), and common ground 316 (216 in FIG. 2). The system 300 further comprises a first current transformer 328 and a second current transformer 330. The system 300 may have functions, material, and structures that are similar to the systems 100-200, therefore common features, functions, and elements may not be redundantly described here.

The first current transformer 328 and the second current transformer 330 measure/sense a first sensed current I(HS) and a second sensed current I(LS) respectively and produce a signal that is similar to an inductor current IL through the inductor 302. For the first current transformer 328 and the second current transformer 330 to function properly, the first current transformer 328 and the second current transformer 330 must not saturate when the first sensed current I(HS) and the second sensed current I(LS) has a DC bias which is either positive or negative.

Therefore, it is necessary to use gap transformer cores in the first current transformer 328 and the second current transformer 330 so that they will not saturate. The first current transformer 328 and the second current transformer 330 are terminated in a resistor 334 and a resistor 338 respectively that produces a signal voltage that comprises a substantially same shape as a signal current; however, the signal voltage will be an AC voltage. Terminating the first current transformer 328 and the second current transformer 330 in the resistor 334 and the resistor 338 creates a high side AC current feedback voltage signal Ifb(HS), and a low side AC current feedback voltage signal Ifb(LS) respectively.

Figure 4:
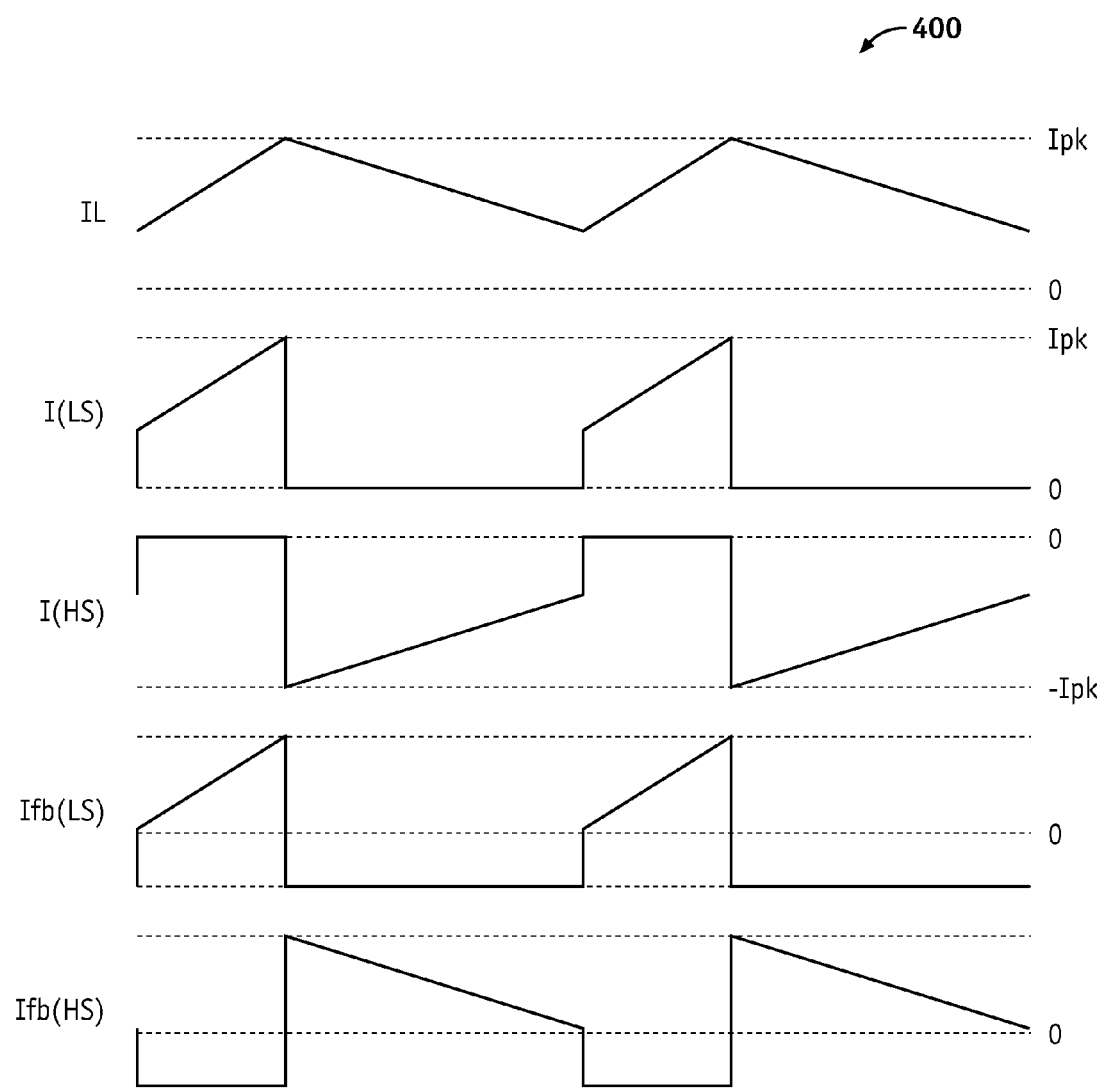
FIG. 4 is an illustration of exemplary current and feedback waveforms for the bi-directional converter of FIG. 3 when operated in a voltage step-up mode according to an embodiment of the disclosure.

FIG. 4 is an illustration of exemplary current and feedback waveforms 400 for the bi-directional converter of FIG. 3 when operated in a voltage step-up mode (boost mode) according to an embodiment of the disclosure. The waveforms comprise the inductor 302 current IL with peaks at Ipk, the high side current I(HS) with peaks at −Ipk, the low side current I(LS) with peaks at Ipk, the high side AC current feedback voltage signal Ifb(HS), and the low side AC current feedback voltage signal Ifb(LS).

First the inductor 302 current IL flows to the common ground 316 through the low side switch 306 while energy builds up in the inductor 302. Then the low side switch 306 is turned off and current flows to the bus 326 through the high side switch 304. The first current transformer 328 and the second current transformer 330 are oppositely phased wherein the signal current is positive for both a high side AC current feedback voltage signal ifb(HS) and a low side AC current feedback voltage signal ifb(LS) during an on-time of the high side switch 304 and the low side switch 306 respectively. Although a shape of the low side current I(LS) is preserved, DC information may be lost. The high side current I(HS) is negative (−Ipk) since it is flowing from source to drain while the low side FET has positive (Ipk) low side current I(LS) since current flows from the drain to the source.

Figure 5:
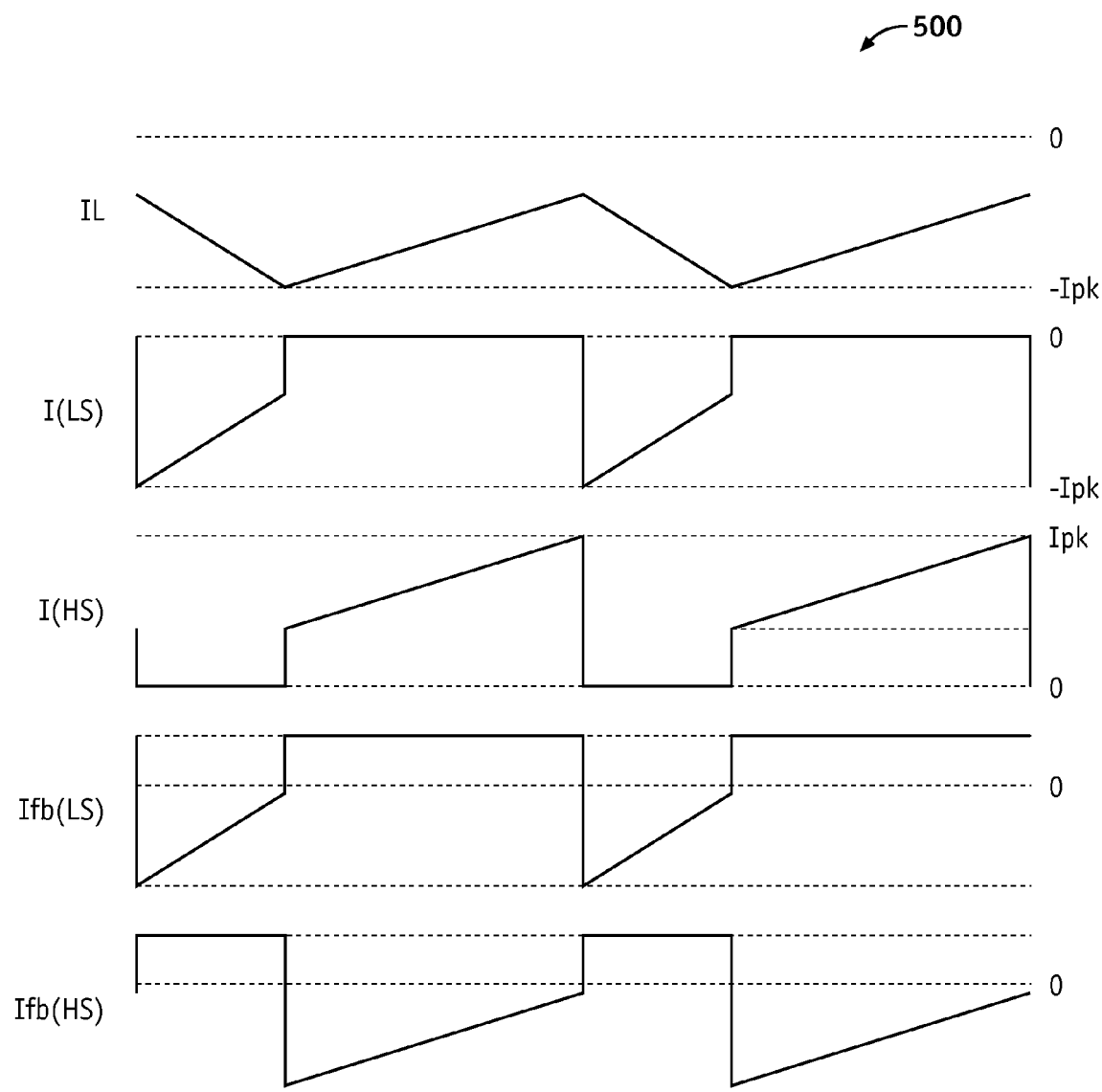
FIG. 5 is an illustration of exemplary current and feedback waveforms for the bi-directional converter of FIG. 3 when operated in a voltage step-down mode according to an embodiment of the disclosure.

FIG. 5 is an illustration of exemplary current and feedback waveforms 500 for the bi-directional converter of FIG. 3 when operated in a voltage step-down mode (buck mode) according to an embodiment of the disclosure. The waveforms comprise inductor current IL with peaks at −Ipk, a high side current I(HS) with peaks at Ipk, a low side current I(LS) with peaks at −Ipk, a high side AC current feedback voltage signal Ifb(HS), and a low side AC current feedback voltage signal Ifb(LS). First, the inductor current IL flows from the common ground 316 though the low side switch 306, while energy is released from the inductor 302. Then, the low side switch 306 is turned off and current flows from the bus 326 through the high side switch 304 to the inductor 302.

Since the first current transformer 328 and the second current transformer 330 are oppositely phased, the current signal is negative for both the high side AC current feedback voltage signal Ifb(HS) (AC waveform Ifb(HS)) and the low side AC current feedback voltage signal Ifb(LS) (AC waveform Ifb(LS)) during the on time of the high side switch 304 and the low side switch 306 respectively. A shape of the low side current I(LS) is preserved; however, the DC information is lost. Once two AC waveforms are created, they can be DC restored and summed together to reconstruct the original inductor current waveform.

A basic principal that permits a DC restore process to work as disclosed herein is that an inductor cannot support a DC voltage in a steady state. Therefore, when current pulses flow in one direction in a primary side winding of a transformer, a magnetizing current increases in such a way that the magnetizing current subtracts from a current on the primary side winding.

For example, if a current I(LS) is flowing into a start terminal of the second current transformer 330 (LS current transformer), a voltage across the primary side winding of the second current transformer 330 is positive. Therefore the magnetizing current of the second current transformer 330 increases until a steady state solution occurs. When current stops flowing in the primary side winding of the second current transformer 330, the magnetizing current can no longer flow into the start terminal of the primary side winding. Therefore the current continues to flow into a start terminal of a secondary winding of the second current transformer 330. This in turns results in a negative voltage during an off time (e.g., when the low side switch 306 is turned off).

In general, the current increases until an average voltage over a full cycle is zero. That is, a first area above a zero line on the high side AC current feedback voltage signal Ifb(HS) or the low side AC current feedback voltage signal Ifb(LS) must be equal to a second area below the zero line. Since the inductance is a relatively large value, the magnetizing current does not change significantly during the off time part of the cycle.

Figure 6:
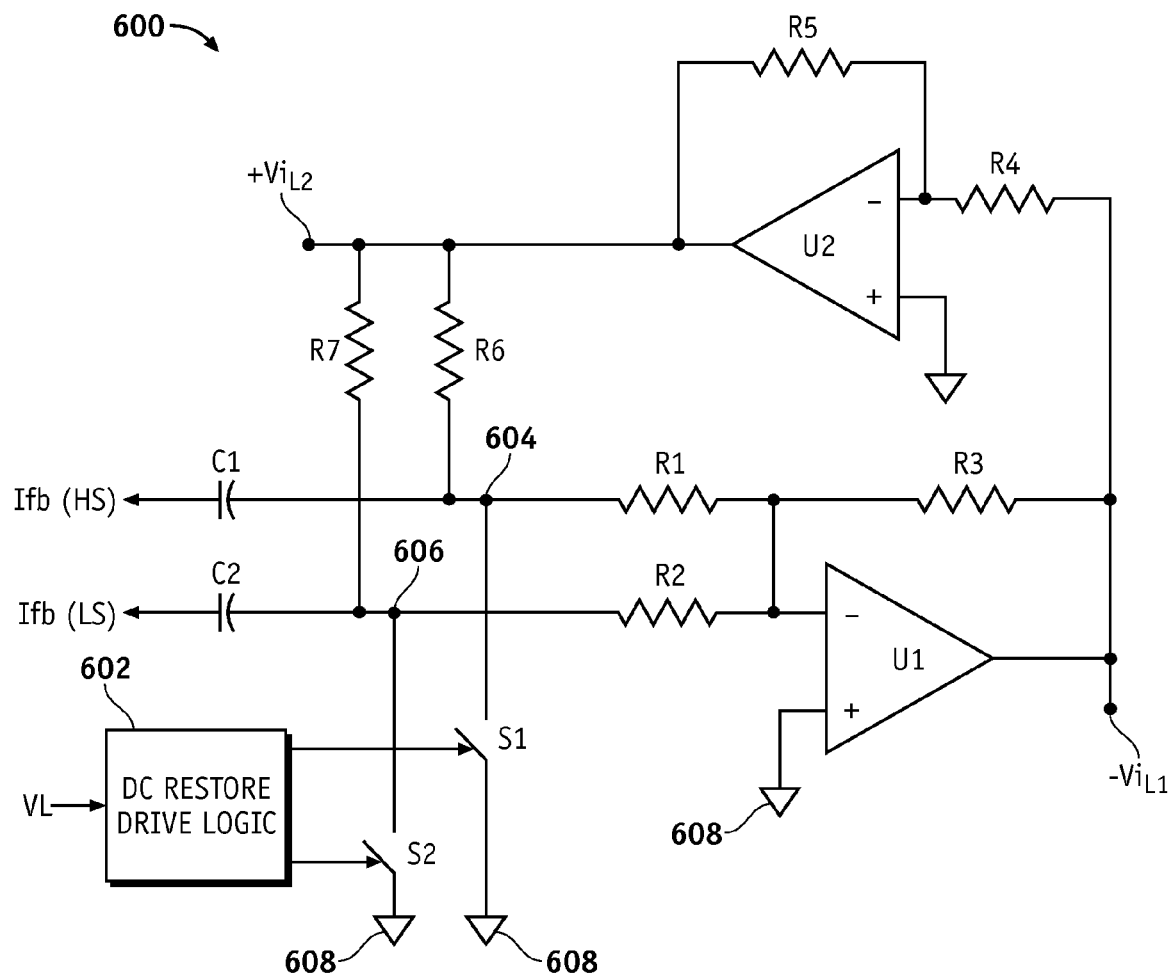
FIG. 6 is an illustration of an exemplary DC restore and summing amplifier circuit according to an embodiment of the disclosure.

FIG. 6 is an illustration of an exemplary DC restore and summing amplifier circuit 600 (circuit 600) according to an embodiment of the disclosure. The circuit 600 DC restores signals and sums the restored signals together. An important feature of the circuit 600 is an ability to synchronously control DC restore switches S1 and S2. DC restore drive logic 602 of the circuit 600 is operable to control the DC restore switches S1 and S2. A voltage VL is received from the bus 326 of the bi-directional converter system 300 (FIG. 3) and is coupled to the DC restore drive logic 602. The voltage VL is a sync signal configured to determine when each of the DC restore switches S1/S2 is turned on. That is, S1 is turned on when the high side current I(HS) in the high side switch 304 is zero and turned off otherwise, and S2 is turned on when the low side current I(LS) in the low side switch 306 is zero and turned off otherwise. When S1 is turned on, a node 604 is coupled to a common ground 608 removing any DC bias that may be present on the node 604, and when S2 is turned on, a node 606 is coupled to a common ground 608 removing any DC bias that may be present on the node 606.

Therefore, the capacitors C1 and C2 are charged to respective voltages (i.e., on the node 604 and the node 606 respectively) that correspond to a zero condition for waveforms of their respective AC current feedback voltage signals (i.e., the AC waveform Ifb(HS) and the AC waveform Ifb(LS) respectively). Thus, a first DC is restored on the node 604 and a second DC is restored on the node 606 to be substantially equal to a DC of the AC waveform Ifb(HS) and a DC of the AC waveform Ifb(LS) respectively. Thereby, a feedback signal on the node 604 is reconstructed to mimic an original waveform of the high side current I(HS) in the high side switch 304. In addition, a feedback signal on the node 606 is reconstructed to mimic an original waveform of the low side current I(LS) in the low side switch 306.

In a first amplifier stage, a summing inverting amplifier U1 (coupled to R3) sums the feedback signal on the node 604 and the feedback signal on the node 606 together so that a voltage signal $-Vi_{L1}$ proportional to the inductor current IL (FIG. 3) is constructed. Currents through R1 and R2 tend to discharge a voltage on C1 and C2. Therefore, a next amplifier stage, a summing inverting amplifier U2 (coupled to the resistors R4 and R5) constructs a larger magnitude voltage signal $+Vi_{L2}$. In addition, the resistors R6 and R7 are arranged wherein a first correction current through resistor R6 is equal to a current in R1, and a second correction current through resistor R7 is equal to a current in resistor R2. Therefore, in a steady state, a current discharging C1 and C2 is effectively reduced to zero.

Figure 7:
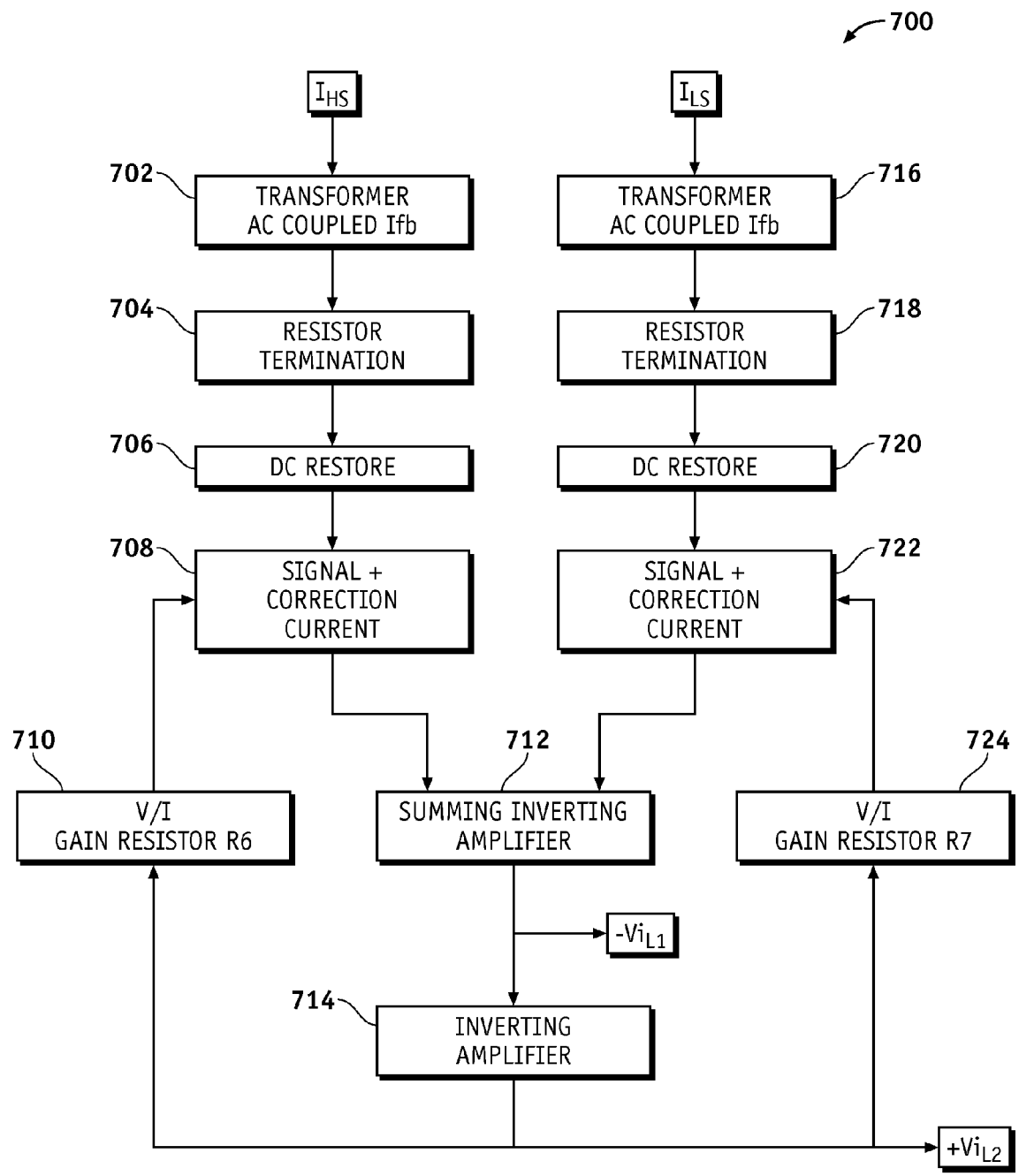
FIG. 7 is an illustration of an exemplary flowchart showing a bi-directional current sensing process according to an embodiment of the disclosure.

FIG. 7 is an illustration of an exemplary flowchart showing a current sensing process 700 (process 700) according to an embodiment of the disclosure. The various tasks performed in connection with the process 700 may be performed mechanically, by software, hardware, firmware, or any combination thereof. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of the process 700 may refer to elements mentioned above in connection with FIGS. 1-6. The process 700 is further described herein especially with reference now to FIGS. 3 and 6. In practical embodiments, portions of the process 700 may be performed by different elements of the systems 100-300 and 600 such as: the source terminal 112, the gate terminal 114, the drain terminal 116, the intrinsic body diode 118, the inductor L1, the first force commutated synchronous rectifier 304, the second force commutated synchronous rectifier 306, etc. The process 700 may have functions, material, and structures that are similar to the embodiments shown in FIGS. 1-6. Therefore common features, functions, and elements may not be redundantly described here.

Process 700 may begin by the high side switch current I(HS) feeding into a primary winding of the first current transformer 328 to create a first AC current proportional to the AC current I(HS) in the high side switch 304 (task 702), and the low side switch current I(LS) feeding into a primary winding of the second current transformer 330 to create a second AC current proportional to the AC current I(LS) in the respective switches (task 716).

Process 700 may continue by terminating the first AC current into the resistor 334 to create a first AC current feedback voltage signal Ifb(HS) (task 704), and terminating the second AC current into the resistor 338 to create a second AC current feedback voltage signal Ifb(LS) (task 718).

Process 700 may continue by the DC restore and summing amplifier 600 DC restoring the first AC current feedback voltage signal Ifb(HS) (task 706), and DC restoring the second AC current feedback voltage signal Ifb(LS) (task 720). The circuit 600 re-establishes the DC bias to the two signals Ifb(HS) and Ifb(LS) after they pass through the capacitors C1 and C2 respectively. The switches S1 and S2 are driven by the DC restore drive logic 602 to create a restored DC voltage on the node 604 and the node 606 respectively. The capacitors C1 and C2 protect the circuit 600 from DC current, allowing the circuit 600 to operate with low power.

Process 700 may then continue by the circuit 600 adding a first correction current (i.e., current through V/I gain resistor R6) to the first AC current feedback voltage signal Ifb(HS) (task 708), and a second correction current (i.e., current through V/I gain resistor R7) to the second AC current feedback voltage signal Ifb(LS) (task 722).

Process 700 may continue by the circuit 600 summing the second AC current feedback voltage signal Ifb(LS) to the first AC current feedback voltage signal Ifb(HS) with the summing inverting amplifier U1 (FIG. 6) to produce an inverted combined signal $-Vi_{L1}$ (task 712). The inverted combined signal $-Vi_{L1}$ is an inverted version of the inductor current IL. The summing inverting amplifier U1 adds reconstructed voltage waveforms on nodes 604 and 606 to create a current feedback signal (i.e., the inverted combined signal $-Vi_{L1}$).

Process 700 may continue by the circuit 600 inverting and amplifying the inverted combined signal $-Vi_{L1}$ with the summing inverting amplifier U2 to produce a combined signal $+Vi_{L2}$ (task 714). The combined signal $+Vi_{L2}$ is an inverted version of the inverted combined signal $-Vi_{L1}$, and a larger magnitude non-inverted version of the inductor current IL.

Process 700 may continue by the circuit 600 producing the first correction current (i.e., current through V/I gain resistor R6) (task 710). The correction current is fed back in the circuit 600 so that a net current out of the circuit 600 is reduced to zero.

Process 700 may continue by the circuit 600 producing the second correction current (i.e., current through V/I gain resistor R7) (task 724).

Figure 8:
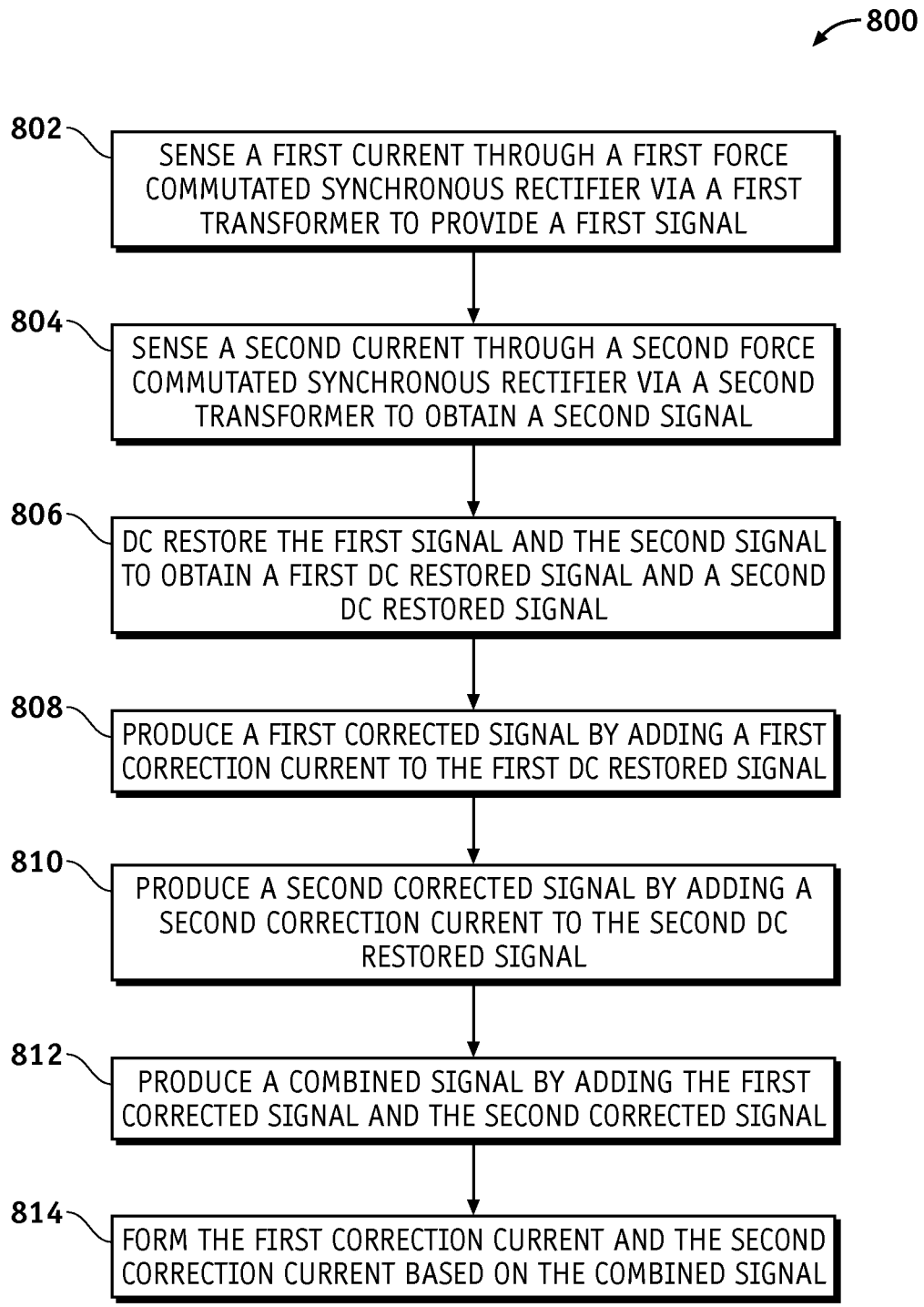
FIG. 8 is an illustration of an exemplary flowchart showing a bi-directional current sensing process according to an embodiment of the disclosure.

FIG. 8 is an illustration of an exemplary flowchart showing a bi-directional current sensing process 800 (process 800) according to an embodiment of the disclosure. The various tasks performed in connection with process 800 may be performed mechanically, by software, hardware, firmware, or any combination thereof. It should be appreciated that the process 800 may include any number of additional or alternative tasks, the tasks shown in FIG. 8 need not be performed in the illustrated order, and the process 800 may be incorporated into a more comprehensive procedure or process having additional functionality not described in detail herein.

For illustrative purposes, the following description of process 800 may refer to elements mentioned above in connection with FIGS. 1-6. In practical embodiments, portions of the process 800 may be performed by different elements of the systems 100-300 and the circuit 600 such as: the source terminal 112, the gate terminal 114, the drain terminal 116, the intrinsic body diode 118, the inductor L1, the first force commutated synchronous rectifier 304, the second force commutated synchronous rectifier 306, etc. The process 800 may have functions, material, and structures that are similar to the embodiments shown in FIGS. 1-3 and 6. Therefore common features, functions, and elements may not be redundantly described here.

Process 800 may begin by sensing/measuring a first current through the first force commutated synchronous rectifier 304 via the first current transformer 328 to provide a first signal (task 802).

Process 800 may then continue by sensing/measuring a second current through the second force commutated synchronous rectifier 306 via the second current transformer 330 to provide a second signal (task 804).

Process 800 may then continue by DC restoring the first signal and the second signal to provide a first DC restored signal and a second DC restored signal (task 806).

Process 800 may then continue by producing a first corrected signal by adding a first correction current to the first DC restored signal (task 808).

Process 800 may then continue by producing a second corrected signal by adding a second correction current to the second DC restored signal (task 810).

Process 800 may then continue by producing a combined signal by adding the first corrected signal and the second corrected signal (task 812).

Process 800 may continue by forming the first correction current and the second correction current based on the combined signal (task 814).

Figure 9:
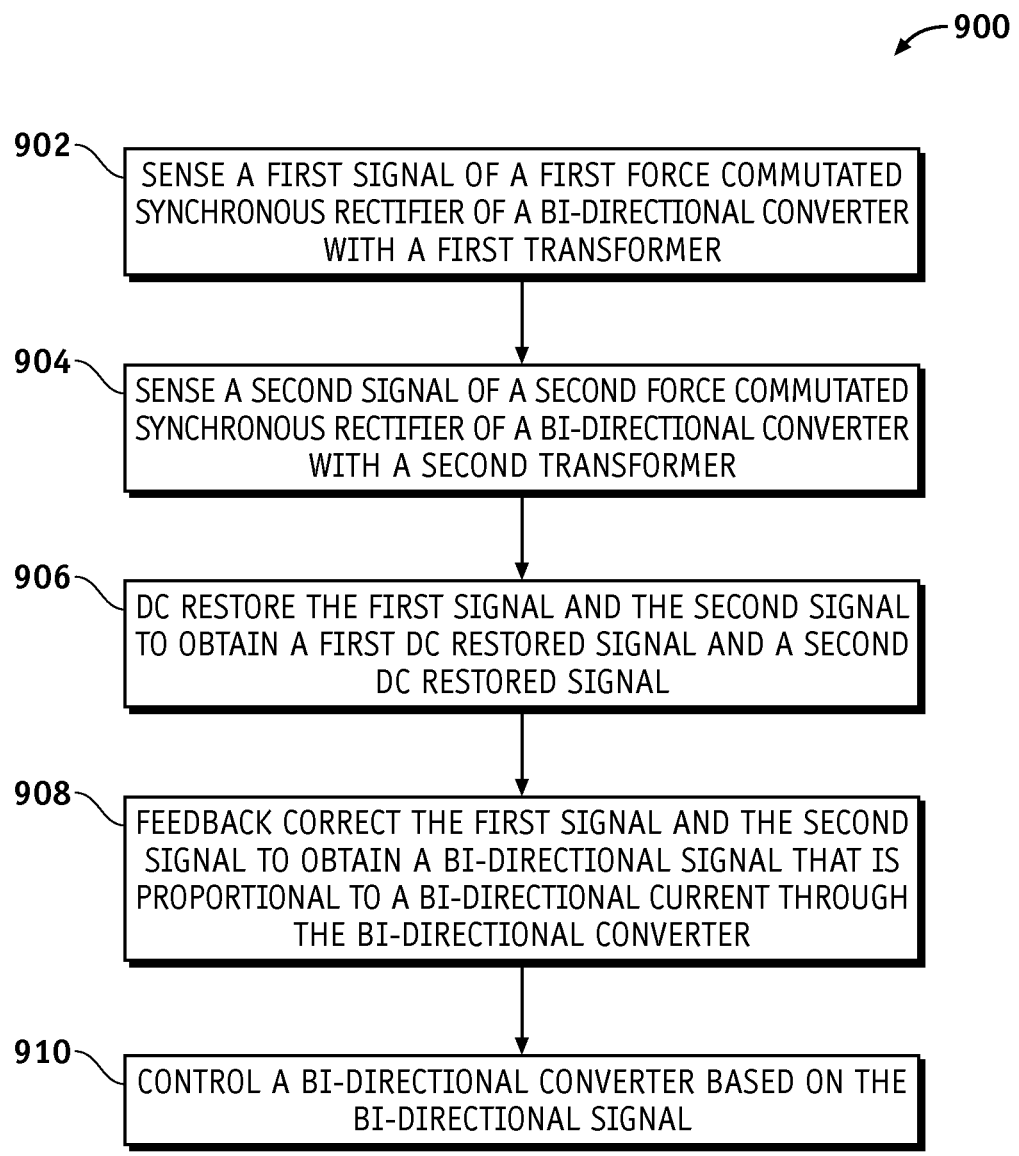
FIG. 9 is an illustration of an exemplary flowchart showing a process for using a bi-directional voltage conversion current sensor according to an embodiment of the disclosure.

FIG. 9 is an illustration of an exemplary flowchart showing a process 900 for using a bi-directional voltage conversion current sensor according to an embodiment of the disclosure. The various tasks performed in connection with process 900 may be performed mechanically, by software, hardware, firmware, or any combination thereof. It should be appreciated that the process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 800 may refer to elements mentioned above in connection with FIGS. 1-6. In practical embodiments, portions of the process 900 may be performed by different elements of the systems 100-300 and the circuit 600 such as: the source terminal 112, the gate terminal 114, the drain terminal 116, the intrinsic body diode 118, the inductor L1, the first force commutated synchronous rectifier 304, the second force commutated synchronous rectifier 306, etc. The process 900 may have functions, material, and structures that are similar to the embodiments shown in FIGS. 1-3 and 6. Therefore common features, functions, and elements may not be redundantly described here.

Process 900 may begin by sensing a first signal of the first force commutated synchronous rectifier 304 of a bi-directional converter with the first current transformer (task 902).

Process 900 may continue by sensing a second signal of the second force commutated synchronous rectifier 306 of the bi-directional converter (system 300) with the second current transformer 330 (task 904).

Process 900 may continue DC restoring the first signal and the second signal to provide a first DC restored signal and a second DC restored signal (task 906).

Process 900 may continue by feedback correcting the first signal and the second signal to provide a bi-directional signal that is proportional to a bi-directional current through the bi-directional converter (system 300) (task 908).

Process 900 may continue by controlling the bi-directional converter based on the bi-directional signal (task 910).

In this way, embodiments of the disclosure provide a bi-directional current sense circuit that is a signal processor that does not sacrifice bandwidth or accuracy to create a replica of the inductor current IL for use as a feedback signal or telemetry signal. Signals in the circuit (e.g., at nodes 604 and 606) are relatively large (on the order of 1V) and therefore an amplifier gain of the circuit can be low. Therefore, a reasonably accurate reproduction of the inductor current IL can be achieved with a standard op amp with a bandwidth of approximately 1 mega-Hz and input offset voltage drift of a few millivolts. The power dissipation associated with method described herein is reasonably low and no special bias voltages are required that wouldn't normally be available.

An existing op amp circuit comprising a shunt in series with an inductor would dissipate a significant amount of power dissipation. Since the signal would be low, the amplifier would have high gain and wide bandwidth to accurately reproduce the inductor current waveform. Furthermore, as the op amp circuit would have a very small input voltage, an input offset voltage of the amplifier (op amp) would significantly affect the accuracy of the circuit. Finally, floating bias supplies would be required to power the circuit since the amplifier would be referenced to a potential of a battery. This may translate to substantially worse performance and higher cost.

Existing magnetic amplifiers (mag amp circuit) use an AC source to excite two back-to-back transformers such that at any given time one transformer is saturated and the other transformer is acting as a current transformer. These circuits are much larger than the embodiments described above and generally have limited bandwidth. Therefore, a high frequency ripple of the inductor current may be lost from the reproduction which may significantly limit the performance of a current feedback loop. The mag-amp circuit may also introduce noise and ripple current which can ultimately introduce low frequency ripple into the current fed to the 100V bus. This is highly undesirable since may be very difficult to filter low frequency noise from the 100V bus.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 and 6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for bi-directional current sensing for a synchronous rectifier bi-directional converter system, the method comprising sensing a first current through a first synchronous rectifier via a first transformer to provide a first signal, sensing a second current through a second synchronous rectifier via a second transformer to provide a second signal, DC restoring the first signal and the second signal by removing a DC bias from the first signal and the second signal to provide a first DC restored signal and a second DC restored signal respectively, wherein the DC restoring comprises: receiving a voltage indicating about zero current in at least one of the first synchronous rectifier and the second synchronous rectifier, and turning on at least one of two DC restore switches based on the voltage thereby grounding at least one of the first signal and the second signal; producing a first corrected signal by adding a first correction current to the first DC restored signal, producing a second corrected signal by adding a second correction current to the second DC restored signal, and producing a combined signal by adding the first corrected signal and the second corrected signal.

2. The method according to claim 1, further comprising forming the first correction current and the second correction current based on the combined signal.

3. The method according to claim 1, further comprising controlling a synchronous rectifier bi-directional converter system based on the combined signal.

4. The method according to claim 1, further comprising controlling a drive logic coupled to the first synchronous rectifier and the second synchronous rectifier based on the combined signal.

5. The method according to claim 1, further comprising forming an inverted combined signal by inverting the combined signal.

6. The method according to claim 5, further comprising controlling a drive logic coupled to the first synchronous rectifier and the second synchronous rectifier based on the inverted combined signal.

7. The method according to claim 6, wherein one of the first synchronous rectifier and the second synchronous rectifier comprises a force commutated synchronous rectifier.

8. The method according to claim 7, wherein the force commutated synchronous rectifier comprises a force commutated synchronous rectifier comprising:
   a field effect transistor (FET) switch comprising a gate terminal, a drain terminal, a source terminal, and an intrinsic body diode comprising a cathode terminal and an anode terminal;
   a commutation diode electrically coupled in parallel to the FET switch, wherein a cathode of the commutation diode is electrically coupled to the cathode terminal of the intrinsic body diode; and
   a selectively controlled forced commutation current source electrically coupled to the commutation diode, and operable to pass a commutation current from the commutation diode to the FET switch while the FET switch is switched on, whereby the commutation current passes from the cathode terminal of the intrinsic body diode to the anode terminal of the intrinsic body diode.

9. A synchronous rectifier bi-directional current sensor system comprising:
   a first transformer operable to sense a first current from a first synchronous rectifier to provide a first signal;

a second transformer operable to sense a second current from a second synchronous rectifier to provide a second signal; and a DC restoration and summing amplifier circuit coupled to the first synchronous rectifier and the second synchronous rectifier, and comprising:

a DC restoration circuit operable to DC restore the first signal and the second signal by removing a DC bias from the first signal and the second signal to provide a first DC restored signal and a second DC restored signal; and a DC summing amplifier comprising:

a first adding circuit operable to produce a first corrected signal by adding a first correction current to the first DC restored signal;

a second adding circuit operable to produce a second corrected signal by adding a second correction current to the second DC restored signal;

a summing inverting amplifier operable to produce a combined signal by adding and amplifying the first corrected signal and the second corrected signal; and an inverting amplifier operable to produce the first correction current and the second correction current by inverting the combined signal.

10. The synchronous rectifier bi-directional current sensor system according to claim 9, wherein one of the first synchronous rectifier and the second synchronous rectifier comprise a force commutated synchronous rectifier.

11. The synchronous rectifier bi-directional current sensor system according to claim 10, wherein the force commutated synchronous rectifier comprises:

a field effect transistor (FET) switch comprising a gate terminal, a drain terminal, a source terminal, and an intrinsic body diode comprising a cathode terminal and an anode terminal;

a commutation diode electrically coupled in parallel to the FET switch, wherein a cathode of the commutation diode is electrically coupled to the cathode terminal of the intrinsic body diode; and a selectively controlled forced commutation current source electrically coupled to the commutation diode, and operable to pass a commutation current from the commutation diode to the FET switch while the FET switch is switched on, whereby the commutation current passes from the cathode terminal of the intrinsic body diode to the anode terminal of the intrinsic body diode.

12. The synchronous rectifier bi-directional current sensor system according to claim 9, further comprising: an inductor; a first force commutated synchronous rectifier coupled to the inductor and operable to eliminate reverse recovery time in a first diode by force commutating a commutation current from a cathode terminal of the first diode to an anode terminal of the diode while switching off a component associated with the first diode; and a second force commutated synchronous rectifier coupled to the inductor and the first force commutated synchronous rectifier and operable to eliminate reverse recovery time in a second diode by force commutating a commutation current from a cathode terminal of the second diode to an anode terminal of the diode while switching off a component associated with the second diode.

13. A method for operating a bi-directional current sensor system, the method comprising: sensing a first signal of a first synchronous rectifier of a bi-directional converter with a first transformer; sensing a second signal of a second synchronous rectifier of a bi-directional converter with a second transformer; DC restoring the first signal and the second signal by removing a DC bias from the first signal and the second signal to provide a first DC restored signal and a second DC restored signal respectively, wherein the DC restoring comprises: receiving a voltage indicating about zero current in at least one of the first synchronous rectifier and the second synchronous rectifier, and turning on at least one of two DC restore switches based on the voltage thereby grounding at least one of the first signal and the second signal; feedback correcting the first signal and the second signal to provide a bi-directional signal that is proportional to a bi-directional current through the bi-directional converter; and controlling a bi-directional converter based on the bi-directional signal.

14. The method according to claim 13, further comprising controlling a drive logic coupled to the first synchronous rectifier and the second synchronous rectifier based on the bi-directional signal.

15. The method according to claim 13, further comprising combining the first signal and the second signal to provide a combined signal and controlling a drive logic coupled to the first synchronous rectifier and the second synchronous rectifier based on the combined signal.

16. The method according to claim 13, further comprising forming an inverted combined signal by inverting the combined signal.

17. The method according to claim 16, further comprising controlling a drive logic coupled to the first synchronous rectifier and the second synchronous rectifier based on the inverted combined signal.

18. The method according to claim 13, wherein one of the first synchronous rectifier and the second synchronous rectifier comprise a force commutated synchronous rectifier.

19. The method according to claim 18, wherein the force commutated synchronous rectifier comprises:

a field effect transistor (FET) switch comprising a gate terminal, a drain terminal, a source terminal, and an intrinsic body diode comprising a cathode terminal and an anode terminal;

switch a commutation diode electrically coupled in parallel to the FET wherein a cathode of the commutation diode switch is electrically coupled to the cathode terminal of the intrinsic body diode; and a selectively controlled forced commutation current source electrically coupled to the commutation diode, and operable to pass a commutation current from the commutation diode to the FET switch while the FET switch is switched on, whereby the commutation current passes from the cathode terminal of the intrinsic body diode to the anode terminal of the intrinsic body diode.

20. The synchronous rectifier bi-directional current sensor system according to claim 9, wherein the removing the DC bias comprises:

receiving a voltage indicating about zero current in at least one of the first synchronous rectifier and the second synchronous rectifier, and turning on at least one of two DC restore switches based on the voltage thereby grounding at least one of the first signal and the second signal.

* * * * *